United States Patent
Winter et al.

(10) Patent No.: US 7,606,846 B2
(45) Date of Patent: Oct. 20, 2009

(54) MANAGING LARGE OLAP IN AN ANALYTICAL CONTEXT

(75) Inventors: Stewart Winter, Metcalfe (CA); Randy Westman, Ottawa (CA); Murray Reid, Munster (CA); Todd Macculloch, Ottawa (CA); Andrew Liekucs, Osgoode (CA)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/473,913

(22) Filed: Jun. 23, 2006

(65) Prior Publication Data
US 2007/0299861 A1    Dec. 27, 2007

(51) Int. Cl.
*G06F 7/00* (2006.01)
(52) U.S. Cl. .......................... 707/205; 707/5
(58) Field of Classification Search ............... 707/1–10, 707/100, 200, 205
See application file for complete search history.

(56) References Cited

U.S. PATENT DOCUMENTS

| | | | | |
|---|---|---|---|---|
| 6,574,623 | B1 * | 6/2003 | Leung et al. | 707/5 |
| 6,691,140 | B1 * | 2/2004 | Bogrett | 707/205 |
| 7,233,952 | B1 * | 6/2007 | Chen | 707/100 |
| 2003/0061358 | A1 * | 3/2003 | Piazza et al. | 709/227 |
| 2005/0038768 | A1 * | 2/2005 | Morris | 707/1 |
| 2006/0085445 | A1 * | 4/2006 | Thanu | 707/100 |
| 2007/0266088 | A1 * | 11/2007 | Wu et al. | 709/204 |

* cited by examiner

*Primary Examiner*—Wilson Lee
(74) *Attorney, Agent, or Firm*—Shumaker & Sieffert, P.A.

(57) ABSTRACT

A large report management system manages a large Online Analytic Processing (OLAP) report. The system segments a set of members of interest for an OLAP report to define one or more segments, and determines an interest degree of each segment. The system generates a summarized representation of each segment that is of lesser interest, and presents a report with members of each segment of greater interest and the summarized representation of each segment of lesser interest.

19 Claims, 3 Drawing Sheets

| Order Amount | 2000 | 2001 | 2002 | All Time |
|---|---|---|---|---|
| Allessari, Silvano | 17,623,466.01 | 17,894,749.78 | 1,109,845.00 | 36,628,060.79 |
| Bendetto, Gerard A. | 7,428,960.00 | 7,052,771.66 | 0.00 | 14,481,731.66 |
| Bershas, James O. | 7,419,667.78 | 17,574,874.36 | 891,613.00 | 25,886,155.14 |
| Brown III, Earnest I. | 12,189,716.49 | 15,986,240.88 | 61,328.26 | 28,237,285.63 |
| Caskey, Mary O. | 4,678,938.62 | 3,879,395.30 | 100,000.00 | 8,658,333.91 |
| Bershas, James O.+ Brown III, Earnest I. | 19,609,384.27 | 33,561,115.25 | 952,941.26 | 54,123,440.78 |
| Subtotal (5 items) | 49,340,748.89 | 62,388,031.99 | 2,162,786.26 | 113,891,567.14 |
| More & hidden | 804,082,246.71 | 915,103,369.23 | 91,224,090.97 | 1,810,409,706.91 |
| Subtotal (included) | 853,422,995.60 | 977,491,401.22 | 93,389,877.24 | 1,924,301,274.06 |
| Subtotal (excluded) | 15,113,190.09 | 19,940,685.69 | 17.50 | 35,053,893.28 |
| All Employees | 868,536,185.69 | 997,432,086.91 | 93,386,894.74 | 1,959,355,167.33 |

Figure 3

| Data Item | Segment Name | Expression |
|---|---|---|
| DI1 | Base | Children(usa) |
| DI2 | Filter Rules | Filter(DI1, [1997][revenue] > 1000 and [DICalc1][Product Cost] < 1000) |
| DI3 | Excluded List | (California, new york) |
| DI4 | Filter Excluded | DI2 – DI3 |
| DI5 | Top Bottom Filter | Top(DI4, 20, percentile, [DICalc2][expenses]) |
| DI6 | Hidden List | (Alaska, Hawaii) |
| DI7 | Included Set | DI5 – DI6 |
| DI8 | Included Subtotal | Aggregate(DI7) |
| DI9 | Visible | BottomShow(Included Set ,10, 2) |
| DI10 | Subtotal | Aggregate(DI8) |
| DI11 | More and Hidden | DI8 – DI10 |
| DI12 | Summary | USA |
| DI13 | Excluded Subtotal | DI12 – DI8 |
| DI14 | Excl Sub Display | If not empty (DI1 – DI7), then DI13 |
| DI15 | Incl Sub Display | If not empty (DI7), then DI8 |
| DI16 | Subtotal Display | If not empty (DI9), then DI10 |
| DICalc1 | 96 + 97 | 1996 + 1997 (opposite axis data item) |
| DICalc2 | 97 – 96 | 1997 – 1996 (opposite axis data item) |

Figure 4

MANAGING LARGE OLAP IN AN ANALYTICAL CONTEXT

FIELD OF THE INVENTION

The present invention relates to a system and method for Online Analytic Processing (OLAP) and multidimensional exploration and analysis, and specifically to a system and method for managing large OLAP in an analytical context.

BACKGROUND OF THE INVENTION

In the Business Intelligence (BI) computer applications domain, business decision makers use analytical software to pose operational performance questions as queries against multi-dimensionally modeled business databases and data warehouses. These multi-dimensional models and analysis software tools are based on Online Analytic Processing (OLAP) concepts and technology. The analysis activity typically involves the creation and manipulation of a cross-tabular (also called "crosstab") and/or graphical presentation of the data.

Large OLAP databases and multi-dimensionally modeled data warehouses typically contain large numbers of dimensional members or flat/non-existent dimensional hierarchies, or both. This is due to a variety of factors, including the volume of available and important data as a business operates and grows, the time constraints and computing resources required to stage and model the data warehouse and make it available for business decision-making processes, the need for flexible, unconstrained models for key business dimensions such as Customers and Time, or non-hierarchical models for inherently parent-child-relationship dimensions such as Invoices and Orders.

Multidimensional queries posed in this "large-OLAP" context often yield OLAP crosstabs containing a large amount of data. Trying to extract meaningful information from OLAP crosstabs becomes increasingly difficult as the size of the crosstab grows. The more data there is, the less likely it is that a user can learn anything useful from it.

The user may sift through data in a crosstab, and may delete or exclude information that is not relevant. However, such manual operations are tedious and prone to errors. If the data set is large enough, governors may be used to limit the size of the data represented in a crosstab. However, this does not give a full representation of all the data there is to examine.

It is therefore desirable to provide a mechanism for better management of large OLAP crosstabs.

SUMMARY OF THE INVENTION

It is an object of the invention to provide an improved system and method for managing large amounts of information stored in OLAP reports in an analytical context.

The invention organizes members of a set of interest to present a compact report with varying degrees of summarization.

In accordance with an aspect of the present invention, there is provided a method of managing a large Online Analytic Processing (OLAP) report. The method comprises the steps of segmenting a set of members of interest that is stored in an OLAP report to define one or more discrete segments; determining an interest degree of each segment; generating a summarized representation of each segment that is of lesser interest; and presenting a report with members of each segment of greater interest and the summarized representation of each segment of lesser interest so that all members of the set are included in the report with different degrees of summarization.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 3 is an example of a crosstab generated by the report management system; and FIG. 4 is a table showing an example of data items provided by the report management system.

DETAILED DESCRIPTION OF PREFERRED EMBODIMENTS

Figure 1:
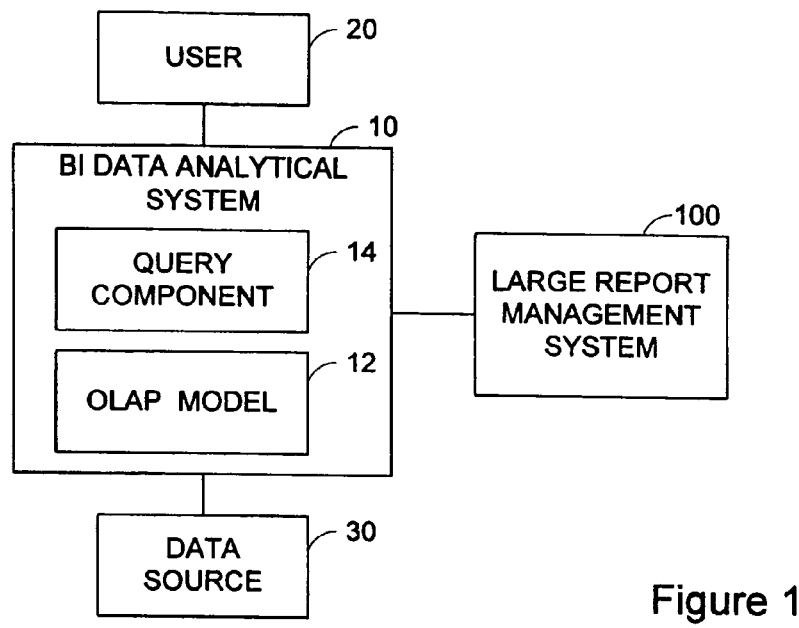
FIG. 1 is a block diagram showing environments of a large data management system in accordance with an embodiment of the present invention.

Referring to FIG. 1, a large report managing system 100 in accordance with an embodiment of the invention The large report managing system 100 manages large OLAP crosstabs for a business intelligence (BI) analytical system 10. The BI analytical system 10 has an OLAP model 12 that represents one or more data sources 30 storing BI data for an organization. Data stores 30 may be a multi-dimensionally modeled business databases and/or data warehouses. Users 20 query the BI analytical system 10 for analysing operational performance of the organization. In response to the queries, a query component 14 of the BI analytical system 10 retrieves relevant BI data from the data sources 30 using the OLAP model 12, and generates views to present the relevant BI data to the users 20. The reports are typically presented in the form of cross-tabs or graphical representations of the data.

The BI analytical system 10 may be suitably implemented in various types of computer systems, including those in server-client environments. While FIG. 1 shows the large report managing system 100 as an independent element from the BI data analytical system 10, in a different embodiment, the large report managing system 100 may be provided as part of the BI data analytical system 10.

The large report managing system 100 manages segmentation which is a methodology of summarization and organization that helps reduce the size of data sets in a report that does not compromise the integrity of the data represented. By using segmentation, the large report managing system 100 allows the user greater facility in deriving useful knowledge from the reports.

Figure 2:
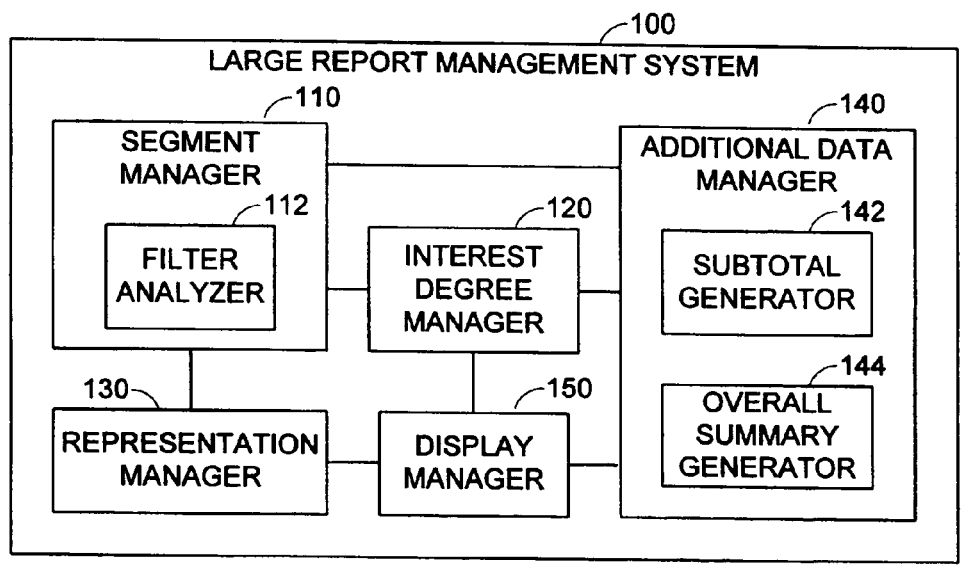
FIG. 2 is a block diagram showing an embodiment of the report management system.

As shown in FIG. 2, the large report managing system 100 comprises a segment manager 110, an interest degree manager 120, a representation manager 130, an additional data manager 140 and a display manager 150.

The segment manager segments members of the set of interest into a series of discrete segments. It assigns a single segment to each member of the set. Each segment contains one or more members.

The segment manager 110 may have a filter analyzer 112 to identify one or more filters applied to the set by the user, and segments the set of members based on the filters. Filtering is the primary mechanism by which members are segmented. There are various types of filters: by measure value, by member label (caption), by attribute value, by excluding members, and by using filter functions, such as the top(n), top(sum) and top(percent). The user may use a filter to specify some members to be displayed, and another filter to specify some members to be included in a report but not displayed.

The interest degree manager 120 determines an interest degree of each segment. The interest degree manager 120 determines a segment containing members specified by the filters as a segment of greater interest, and a segment containing members filtered out by the filters as a segment of lesser interest. In one implementation of the idea, those members that pass the filter criteria are those of most interest. Additionally there is a display limit which governs the number of passed-filter members that are shown. The displayed members can be based on their natural order as returned from the data source, a sorted order (ascending, descending), or their position in the result of the filter expression. A segment containing those non-displayed members that pass the filter criteria and specified to be not displayed is considered as a segment of lesser interest than a segment containing those displayed members, but of greater interest than a segment containing those members that do not pass the filter criteria.

The representation manager 130 generates a summarized representation of each segment of lesser interest. The representation generator 130 aggregates and/or calculates members of each segment of less interest so that the members of lesser interest are represented in less detail in a report. Non-displayed members that pass the filter criteria are summarized in a remainder segment ("More"). Members that do not pass the filter criteria are summarized in an excluded segment. Such a summarized representation enhances readability of the report.

The additional data manager 140 manages additional data items that describe relevant data. The additional data manager 140 may have a subtotal generator 142 and an overall summary generator 144. The subtotal generator 142 aggregates measures of the members of the segment of greater interest and generates a subtotal. The overall summary generator 144 generates an overall summary or aggregation of all the members in the set of interest. These additional data items describe the data to augment the user experience in analysing the report.

The display manager 150 presents a report with members of each segment of greater interest and the summarized representation of each segment of lesser interest. The display manager 150 explicitly presents measure values of the members of segments of greater interest to provide a higher amount of detail to the user.

In addition to displaying the segments, the display manager 150 may also display additional data items that describe the data, such as a subtotal of each segment of greater interest, and the overall summary of all the members in the set. If there are any calculations individually defined by the user, the display manager 150 also present those calculations.

Thus, the large report managing system 100 can allow compact representation of the data of all the members of the set of interest with varying degrees of summarization or granularity. The members of greater interest are presented explicitly in detail, and the members of lesser interest are presented as a summarized representation. The large report managing system 100 therefore enhances readability and clarity of the information in the report. The user can derive useful information from the report more easily. Since the report is compact, the system 100 can prevent the user from becoming overwhelmed with large amount of data even when a set of members that are of interest to the user is large. Since all the members of the set are represented, the user can explore and analyze their data without fear of missing vital information.

The report management system 100 may use the following rules to segment data sets for displaying a crosstab:

1. The user applies filters (or rules) to the set that specify which members are of greater interest (e.g. Top 10 members for a given measure value). The segment containing these specific members are considered to be the "included" segment, which is further separated into "visible" and "remainder" segments. Each of the members of the visible segment is displayed along the crosstab edge.
2. The measure values for the members of the included segment are also aggregated and displayed as a subtotal.
3. Individually defined calculations defined by the user are displayed with the members of the visible segment.
4. The overall summary is generated as an aggregation of all the members in the set of interest and displayed in the crosstab.
5. All other members are considered to be of lesser interest. Within the included segment, the members of lesser interest are the remainder segment, which are displayed as "More and Hidden", which contains a list of members that are not visible. The More and Hidden segment is represented by an aggregation of all members in this segment.
6. A subtotal (excluded) that is an aggregation of all members in the set of interest that were filtered out is also generated and displayed. The subtotal (excluded) is considered as a new segment and a data item. As a segment it is an element of the conceptual model, whereas as a data item it is the manifestation of that element in the implementation, namely the query specification.

An example of the operation of the report management system 100 is now described for segmentation of data sets to generate a crosstab shown in FIG. 3. The crosstab shows the order amount data for all employees.

In this example, members of a set of interest are specified as the expression "children of All Employees". For a large organization, the number of employee members, and the amount of data relating to all employees is large. If data for all employees is shown in a single crosstab, the crosstab becomes so large that it is difficult for the user to derive useful information from it. Instead of presenting such a large crosstab, the large report manager system 100 presents a compact representation as shown in FIG. 3 as set out below.

In this example, the user applies two filters to the set All Employees. The first filter specifies five child members in the set to be visible in the report: Allessori, Bendetto, Bershas, Brown III and Caskey. The second filter specifies some members in the set to be included but hidden in the report. The user also defines a calculation to calculate a total order amount for the sum of employee members Bershas and Brown III.

The report manager system 100 segments the children of the set All Employees into three segments: the first segment including the specified five members that passed the first filter, the second segment including the members that passed the second filter, and the third segment including all other members in the set that were filtered out, in this example by explicitly excluding one or more members. The report manager system 100 determines that the first segment is of greater interest, and the second and third segments are of lesser interest.

The report manager system 100 generates a summarized representation for the second segment by aggregating data of the members of the second segment. Similarly, it generates a summarized representation for the third segment.

The report manager system 100 also generates a subtotal of the first segment containing the five visible members, and an overall summary total for all members in the set All Employees.

The report manager system 100 then displays the crosstab shown in FIG. 3. The crosstab row edge consists of a single block (or set) of all the segments. This block is based around the expression "children of All Employees". The block has the seven parts: individual visible members, calculations, a subtotal (visible), more and hidden members, a subtotal (included), a subtotal (excluded), and a summary member representing the aggregated total for the set of all employees. The individual visible members part explicitly presents the members of the first segment, i.e., the five visual members specified by the first filter. The calculations part shows the user defined calculation for a total order amount of Bershas and Brown III. The subtotal (visible) part presents a summarized representation the five visual members of the first segment. The more and hidden members part presents the summarized representation of the second segment, i.e., the hidden members filtered by the second filter. The subtotal (included) part presents the total of the second and third segments, i.e., all members that passed the first and second filters. The subtotal (excluded) part presents the summarized representation of the third segment, i.e., all members that were filtered out. In this example, one member was filtered out by the first and second filters. The summary total part presents the overall summary total for all members in the set All Employees.

Thus, the report management system 100 can provide a compact crosstab representing all members in the set All Employees with varying degrees of summarization and granularity.

Within the BI data analytical system 10, several types of blocks (or sets) may be expressed. For example, the BI data analytical system 10 may have a block for children of member, a block of members at a level, i.e., at the same level in a dimensional hierarchy, a block of a list of individually selected members from same dimension, a block of descendant members at a specified depth relative to the level of each of the members included in another block, a block of members from the same dimension but at a lower dimensional level for each the members in another block (a.k.a. a single dimension nested block), a block of a list of measures, and a block of children of a measure. The report management system 100 may segment members in a block depending on the block type.

The block for children of a member and the block of members at a level have equivalent functionality and have the same segmentation capability. The block of descendant members and the block of single dimension nested members have the same segmentation capability. All of these block types can be referred to as expression-based blocks.

The report management system 100 segments each of these blocks to generate the data items including Base, Summary (or Total), Filter Rules, Excluded List, Excluded Filter, Filter Top Bottom, Subtotal Included, Included Subtotal Display, Subtotal Excluded, Excluded Subtotal Display, Hidden List, Included Set, Visible, Subtotal, Subtotal Display, More and Hidden, More and Hidden Display, and Calculations.

The Base item includes the entire set of members.

The Summary (or Total) item is either the root members (for children of) or the aggregate of the base item.

The Filter Rules item is a filter that reduces the set using operators such as "greater than" or "less than" based on measures, captions (labels) or attributes and operating within a tuple context.

The Excluded List item is an explicit list of members that are always to be filtered out.

The Excluded Filter item subtracts the excluded list from the filter rules.

The Filter Top Bottom item is a third filter that further reduces the members based on top/bottom based on count, percentile or running total.

The Subtotal Included item is the data that passes the above three filters.

The Included Subtotal Display item conditionally displays the subtotal included.

The Subtotal Excluded item represents the difference between the values of Summary item and the aggregate of the Subtotal(Included) segment.

The Excluded Subtotal Display item conditionally displays the subtotal excluded.

The Hidden List item is a list of members that the user wants included as part of the set (i.e. not filtered), but does not wish to have appear in the visible members list.

The Included Set item is a set of members in the block that pass the filters and do not appear in the hidden list.

The Visible item is the individual members that the user sees in the crosstab. The report management system 100 may provide a maximum number of visible members. Typically, the report management system 100 may provide the maximum value as a guideline more than an absolute setting. For example, if there exists one more member than the specified maximum, the system 100 may show it rather than a remainder. The report management system 100 may allow the user to define the maximum value of the number of visible members and the boundary limit. The choice of visible members can be based on a sort order.

The Subtotal item is an aggregate of the visible members.

The Subtotal Display item conditionally evaluates to either subtotal or empty set.

The More and Hidden item is an aggregation (where reasonable) of members which are hidden and that which are not shown because they exceed the maximum to show.

The More and Hidden Display item conditionally evaluates to either more and hidden or empty set. Where this set represents no members, then it is empty.

The Calculations item is a set of the calculations that are individually defined by the user.

The report management system 100 may also generate additional data items.

The report management system 100 places into the visible portion of the crosstab the data items including Visible members, Calculations, Subtotal Display, More and Hidden Display, Included Subtotal Display, Excluded Subtotal Display, Summary.

The report management system 100 may allow the user to disable the display of each of the above display elements from the crosstab.

A block of an explicit list of members from the same dimension is a High Affinity Member Cluster (HAMC), a.k.a. a selection set. The base set consists of a list of members. The report management system 100 may segment the list of members with core segments including Base, Calculations and Total. The Base core segment is the set containing individual members that the user sees. The Total core segment is the aggregation of the set of members. Individual members are assigned to one segment. A member cannot exist in more than one segment. A calculation, including Total for a HAMC, introduces a new segment based on values of members in other segments. The individual members that the user sees belong to the Base core segment. The Total core segment is the aggregation of all the members in the Base core segment.

The report management system 100 also provides additional data items to allow features like % of total to work generically. The additional data items include Filter Rules, Excluded List, Excluded Filters, Filter Top Bottom, Included Subtotal, Included Set, Hidden List, and Visible Items.

The report management system 100 places into the visible portion of the crosstab the data items including Visible members, Calculations, and Total.

The block of list of measures is a Measure HAMC. The main set of this block consists of a list of measures.

The report management system 100 segments the list of measures to a Base core segment which contains the individual members that the user sees.

The report management system 100 also provides additional data items including Included Set, and Visible Items.

The report management system 100 places into the visible portion of the crosstab the data set including Visible members and Calculations.

The block of children of measure has a main set consisting of a list of members. The report management system 100 provides data items including Base, which is the entire set, Total which is the root measure, Filter Rules which is a placeholder, Excluded List which is a placeholder, Excluded Filter which is a placeholder, Filter Top Bottom which is a placeholder, Subtotal Included which is the data that passes the three filters, Hidden List which is a list of measures that the user wants included as part of the set (i.e., not filtered) but does not wish to have appear in the visible members list, Included Set which is the set of measures that pass the filters and do not appear in the hidden list, Visible which is the individual measures that the user sees, Subtotal which is an aggregate of the visible measures, Subtotal Display which conditionally evaluates to either subtotal or empty set, More and Hidden which is an aggregation (where the measure members are aggregatable; some types of measures are not) of that which is hidden and that which is not shown because it exceeds the maximum to show, More and Hidden Display which conditionally evaluates to either more and hidden or empty set, and Calculations which is a set of all calculations individually defined by the user. The More and Hidden Display item is empty where this set represents no measures.

For the Visible item, the report management system 100 may provide a maximum number of visible members. Typically, the report management system 100 may provide the maximum value as a guideline rather than an absolute setting. The report management system 100 may allow the user to define the maximum value of the number of visible members and the boundary limit. The choice of visible measures is typically controlled only by hidden members and the natural order of the measures stored in the database.

The report management system 100 may provide additional data items.

The report management system 100 places into the visible portion of the crosstab the data items including Visible members, Calculations, Subtotal Display, More and Hidden Display, and Summary.

FIG. 4 shows the transformation of one set into the individual data items of a query. Each segment is represented by a separate data item. In this example, the report management system 100 provides 16 data items. There are also two calculations defined by the user. Each data item has a segment name as shown in the table. Each segment is represented by one data item in the underlying query. The expression of each data item is also shown in the table.

The report management system 100 shows in a crosstab data items DI9, DI11, DI15, DI14, and DI12.

The report management system 100 may also tie the segmentation feature to a 'fixed' context. This context is a list of filters. This implies that the 'core' data item has an additional context property, which is a data item reference.

The report management system 100 may also use slicer style filters. Slicers are used to filter by a single member of a dimension, a block (generated set of members), or an explicitly selected list of members (in the HAMC block case).

Because filters can be defined in terms of a data item representing the 'included set' segment, and because the included set segment is based on the context property of the core data item, which can use a list of filters in its definition, the report management system 100 provides an ability for an unlimited number of data items to make up the definition of these segments.

The large report managing system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the large report managing system are described separately, however, two or more elements may be provided as a single element, or one or more elements may be shared with other components in one or more computer systems.

What is claimed is:

1. A method of managing a large Online Analytic Processing (OLAP) report, the method comprising:
   segmenting, by a computing device, a set of members of interest that is represented by an OLAP report according to an OLAP model to define one or more discrete segments;
   determining, by the computing device, an interest degree of each discrete segment, wherein the interest degree comprises one of greater interest or lesser interest;
   generating a summarized representation of each discrete segment that is determined to comprise an interest degree of lesser interest, wherein the summarized representation comprises an aggregation of the corresponding discrete segment; and
   presenting a report that includes detailed representations of members of each discrete segment determined to comprise an interest degree of greater interest and that includes the summarized representation of each discrete segment determined to comprise an interest degree of lesser interest.

2. The method as claimed in claim 1, wherein segmenting comprises assigning each member of the set to a single discrete segment.

3. The method as claimed in claim 1, wherein segmenting comprises analyzing one or more filters applied to the set by a user for segmentation of the set of members based on the filters.

4. The method as claimed in claim 3, wherein determining the interest degree comprises determining that the interest degree of a discrete segment containing members specified by the filters comprises a greater interest, and that the interest degree of a discrete segment containing members filtered out by the filters comprises a lesser interest.

5. The method as claimed in claim 4, wherein generating a summarized representation comprises aggregating the members that are filtered out.

6. The method as claimed in claim 1 further comprising: providing additional data items that describe data of the members of the set.

7. The method as claimed in claim 6, wherein
providing additional data comprises generating a subtotal of the members of the discrete segment of greater interest, and
presenting comprises presenting the members of the discrete segment of greater interest with the subtotal.

8. The method as claimed in claim 6, wherein
providing additional data comprises generating an overall summary of all the members of the set, and
presenting comprises presenting the overall summary.

9. The method as claimed in claim 1 further comprising providing to a discrete segment a fixed context property having a data item reference.

10. The method of claim 1, wherein generating a summarized representation comprises calculating, by the computing device, the aggregation of the corresponding discrete segment, and calculating members of the corresponding discrete segment.

11. A method comprising:
retrieving data from a multidimensional database that stores data according to an Online Analytic Processing (OLAP) model;
receiving a definition of a greater interest and a definition of a lesser interest;
segmenting, by a computing device, the data into a plurality of discrete segments according to interest degrees, a first discrete segment of the plurality of discrete segments corresponding to data having a greater interest and a second discrete segment of the plurality of discrete segments corresponding to data having a lesser interest, by assigning portions of the data that match the definition of the greater interest to the first discrete segment and assigning portions of the data that match the definition of the lesser interest to the second discrete segment;
summarizing, by the computing device, the data of the second discrete segment by aggregating the data of the second discrete segment; and
presenting an OLAP report representative of the data, wherein the OLAP report includes a detailed representation of the data of the first discrete segment and the summarized data of the second discrete segment.

12. A computing system comprising:
a computer-readable storage medium encoded with instructions for a segment manager, an interest degree manager, a representation manager, and a display manager;
a display; and
a processor to execute the instructions for the segment manager, the interest degree manager, the representation manager, and the display manager,
wherein the segment manager is configured to segment a set of members of interest that is represented by an OLAP report according to an OLAP model to define one or more discrete segments,
wherein the interest degree manager is configured to determine an interest degree of each discrete segment, wherein the interest degree comprises one of greater interest or lesser interest;
wherein the representation manager is configured to generate a summarized representation of each discrete segment that is determined to comprise an interest degree of lesser interest, wherein the summarized representation comprises an aggregation of the corresponding discrete segment; and wherein the display manager is configured to cause the display to present a report that includes detailed representations of members of each discrete segment determined to comprise an interest degree of greater interest and that includes the summarized representation of each discrete segment determined to comprise an interest degree of lesser interest.

13. A computer-readable storage medium encoded with instructions for causing a programmable processor to:
segment a set of members of interest that is represented by an OLAP report according to an OLAP model to define one or more discrete segments;
determine an interest degree of each discrete segment, wherein the interest degree comprises one of greater interest or lesser interest;
generate a summarized representation of each discrete segment that is determined to comprise an interest degree of lesser interest, wherein the summarized representation comprises an aggregation of the corresponding discrete segment; and
present a report that includes detailed representations of members of each discrete segment determined to comprise an interest degree of greater interest and that includes the summarized representation of each discrete segment determined to comprise an interest degree of lesser interest.

14. The computer-readable medium as claimed in claim 13, wherein the instructions to segment comprise instructions to assign each member of the set to a single discrete segment.

15. The computer-readable medium as claimed in claim 13, wherein the instructions to segment comprise instructions to analyze one or more filters applied to the set by a user for segmentation of the set of members based on the filters.

16. The computer-readable medium as claimed in claim 15, wherein the instructions to determine the interest degree comprise instructions to determine that the interest degree of a discrete segment containing members specified by the filters comprises a greater interest, and that the interest degree of a discrete segment containing members filtered out by the filters comprises a lesser interest,
wherein the instructions to generate a summarized representation comprise instructions to aggregate the members that are filtered out.

17. The computer-readable medium as claimed in claim 13 further comprising instructions for causing the programmable processor to provide additional data items that describe data of the members of the set.

18. The computer-readable medium as claimed in claim 17, wherein
the instructions to provide additional data comprises instructions to generate a subtotal of the members of the discrete segment of greater interest, and
the instructions to present comprise instructions to present the members of the discrete segment of greater interest with the subtotal.

19. The computer-readable medium as claimed in claim 18, wherein
the instructions to provide additional data comprise instructions to generate an overall summary of all the members of the set, and
the instructions to present comprise instructions to present the overall summary.

* * * * *

UNITED STATES PATENT AND TRADEMARK OFFICE
CERTIFICATE OF CORRECTION

| | | |
|---|---|---|
| PATENT NO. | : 7,606,846 B2 | Page 1 of 1 |
| APPLICATION NO. | : 11/473913 | |
| DATED | : October 20, 2009 | |
| INVENTOR(S) | : Steward Winter et al. | |

It is certified that error appears in the above-identified patent and that said Letters Patent is hereby corrected as shown below:

On Title page, field "(75) Inventors:", the last inventor's name should read --Andrew Leikucs, Osgoode (CA)-- rather than "Andrew Liekucs, Osgoode (CA)".

Signed and Sealed this

Twenty-sixth Day of January, 2010

David J. Kappos
*Director of the United States Patent and Trademark Office*